G. W. SPALDING.
POCKETED CARRIER AND METHOD OF PRODUCING THE SAME.
APPLICATION FILED OCT. 4, 1920.
Reissued Nov. 16, 1920. 14,989.
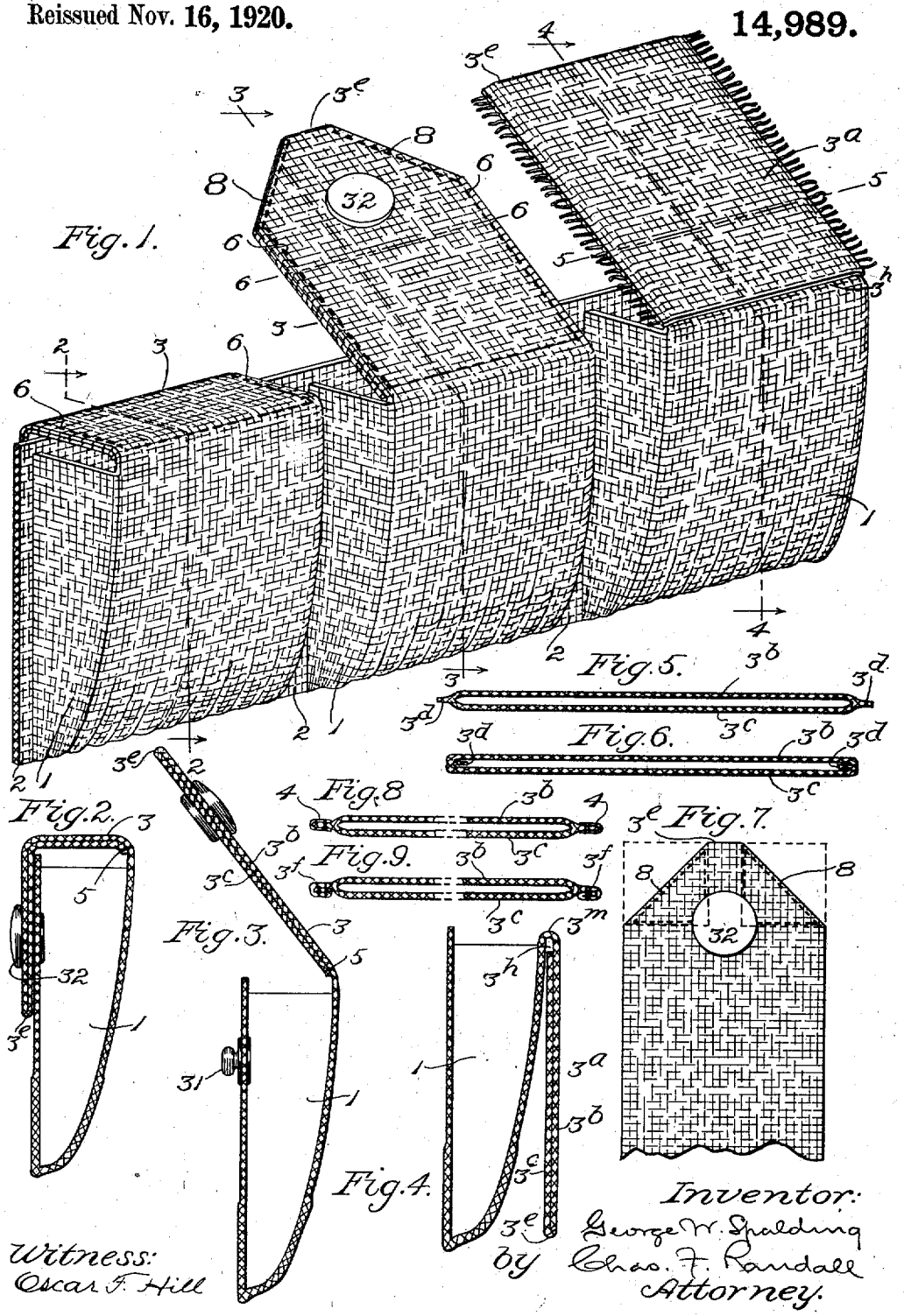

UNITED STATES PATENT OFFICE.

GEORGE W. SPALDING, OF WORCESTER, MASSACHUSETTS, ASSIGNOR, BY MESNE ASSIGNMENTS, TO FRANK R. BATCHELDER, OF WORCESTER, MASSACHUSETTS.

POCKETED CARRIER AND METHOD OF PRODUCING THE SAME.

14,989. Specification of Reissued Letters Patent. Reissued Nov. 16, 1920.

Original No. 1,339,795, dated May 11, 1920, Serial No. 254,742, filed September 19, 1918. Application for reissue filed October 4, 1920. Serial No. 414,670.

*To all whom it may concern:*

Be it known that I, GEORGE W. SPALDING, a citizen of the United States, residing at Worcester, in the county of Worcester, State of Massachusetts, have invented a certain new and useful Improvement in Pocketed Carriers and Methods of Producing the Same, of which the following is a specification, reference being had therein to the accompanying drawings.

The invention has relation in general to pocketed carriers on the order of those which are used for holding and carrying cartridges, packaged first-aid supplies, etc. Among the pocketed carriers to which the invention is applicable are comprised cartridge-carriers, hospital corps belts, medical officers' belts, and others having various special adaptations.

More particularly, the invention has relation to the pocket cover-flaps of woven material with which carriers of the general class aforesaid are provided; especially to pocket cover-flaps which are woven integral with other parts of the carriers, although some of the features of invention are not necessarily confined to covers or cover-flaps which are thus woven.

The invention resides in pocketed carriers having pocket cover-flaps attached to the pocket-fronts and fastening at the back of the carrier, and also embodying various novel principles and features in their construction and in their combination with the pocket-fronts; as well as in the method of producing a series of flaps upon a main web.

Pocket cover-flaps made in accordance with the invention preferably, though not necessarily in all cases, are composed of two or more thicknesses of material and embody certain further novel characteristics. The accompanying drawings illustrate different embodiments of the principles and features aforesaid, and also illustrate the method of production.

In the drawings,—

Figure 1 is an isometric view of a portion of a partly finished pocketed carrier illustrating the invention.

Fig. 2 is a view in vertical section in approximately the plane of dotted line 2—2 of Fig. 1.

Fig. 3 is a view in vertical section in approximately the plane of dotted line 3—3 of Fig. 1.

Fig. 4 is a view in section in approximately the plane indicated by line 4—4 of Fig. 1, but showing the cover-flap down in front of the pocket in substantially the relation thereto in which it is produced in the loom.

Fig. 5 is a view of a pocket cover-flap before being introverted, substantially as at the right-hand side of Fig. 1, after the projecting ends of warp-threads have been trimmed off.

Fig. 6 is a view of the introverted cover-flap at the middle of Fig. 1, in cross-section on line 6—6.

Fig. 7 is a view of a part of a cover-flap, illustrating the tucking of portions thereof to form a peak.

Figs. 8 and 9 are views in cross-section illustrating modes of finishing off the side-margins of cover-flaps which are not introverted.

Having reference to the drawings,—

Fig. 1 shows a carrier-web section comprising three pockets 1, 1, with the cover-flaps, two of the latter being in a finished state while the third is unfinished. The invention may be utilized in the manufacture of carriers having in their finished state a series of pockets connected together as in the drawings, or in that of those having or consisting of individual pockets. The pockets are joined together in the carrier-web by the band-portions, 2, 2, which are formed intermediate and at opposite sides of the respective pockets. After the weaving of the carrier-web it is divided up by cutting across through said band-portions 2, 2, into sections comprising respectively the required number of pockets. Finished cover-flaps are shown at 3, 3, in Figs. 1, 2, and 3, an unfinished cover-flap being represented at $3^a$ in Figs. 1 and 4. Interengaging fastener-members 31, 32, of the glove-fastener type are shown provided for use in securing the cover-flap in closed condition, the stud-member 31 being attached to the back of the carrier and the socket-member 32 being attached to the cover-flap, in conformity with the main feature of the present invention.

One feature of the present invention consists in forming the cover-flaps of a plurality of thicknesses of material. The drawings show two thicknesses, namely $3^b$, $3^c$, which are united along the side-margins of a cover-flap, thereby giving the latter a tubular construction as appears in Figs. 5 and 6. Preferably, though not necessarily in all instances, the uniting is effected by interweaving, as at $3^d$, $3^d$, in Figs. 5 and 6, thereby dispensing with stitches and other fastening means for this purpose, and with the operations by which the same are applied. Thereby, also, the cover-flap is produced of seamless tubular weave, which is a feature entering into the present invention. In the present instances, the thicknesses $3^b$, $3^c$, are joined together at the side margins of a cover-flap by being interwoven in flat marginal flanges at $3^d$, $3^d$.

The thicknesses composing the cover-flap are united across the outer or free end of the latter, as at $3^e$, so as to close the said end. Preferably, this is effected in the weaving, as will be apparent from the drawings, thereby dispensing with stitches and other fastening means for the purpose and with the operations by which the same are applied.

Another feature of invention consists in the cover-flaps formed as aforesaid being woven upon and integral with the front-walls of the pockets, so that the cover-flap folds inward over the pocket and fastens at the back of the latter, the fastener-member 31 being applied to the reverse side of the carrier.

Cover-flaps embodying the features thus far described may be used without further finishing than the application of binding tapes 4, 4, as in Fig. 8, to the projecting flanges $3^d$, $3^d$; or the hemming of the said flanges as at $3^f$, $3^f$, in Fig. 9. As a further feature of invention, however, the cover-flaps are so formed that raw or cut edges at the margins thereof are inclosed between the thicknesses composing a cover-flap, and thereby are concealed and protected. Preferably this is effected by introverting each tubular cover-flap, so that the original exterior thereof and its marginal edges become disposed at the interior of the cover-flap, as in Fig. 6. The introverted cover-flap presents only smooth and firm margins, as will be apparent from Figs. 1 and 6. The introversion is provided for by forming the cover-flaps with open mouths at their inner ends, the thicknesses being formed distinct from each other across the inner end of the cover-flap, producing a slit, $3^h$, Figs. 1 and 4, which constitutes a mouth. After the introversion, the thicknesses are fastened together across the said end so as to close the slit, if desired, by means of a line 5 (Figs. 2 and 3) of fastenings, usually stitches. Other lines, 6, 6, Fig. 1, may be applied along the side margins.

The tubular character of the cover-flap facilitates the formation of the free end of the cover-flap into a peak as in Figs. 1 and 7, if desired, by tucking the corners of such end between the thicknesses, as indicated in Fig. 7. Suitable lines 8, 8, of stitches secure the corners in tucked condition.

In closing the pocket, the free end of the cover-flap 3 is carried inward over the pocket and down at the back of the latter, and is fastened at the said back. After the said end has been unfastened, the cover-flap will fall or may be turned forward and outward away from over the top of the pocket, out of the way, and will not have to be held out of the way in order to render the contents of the pocket accessible.

The method of producing a series of flaps upon a main web, constituting a part of the invention, consists essentially in conducting the weaving so as to form the main web and also form a supplemental web composed of transversely tubular sections respectively having one cloth thereof woven to the said main web, and then severing the said supplemental web transversely between the tubular sections to separate the flaps from one another. This method may be carried into practical effect variously. The supplemental web may be produced in the relation to the main, or pocketed, web that is indicated in the case of the unfinished cover-flap $3^a$ in Fig. 4. In weaving a tubular section constituting a cover-flap of the said carrier, the weft or filling will extend in one pick from the free edge of portion $3^c$ through such portion to the margin at $3^e$ of the supplemental web. The next pick will extend from the margin at $3^e$ through the other cloth $3^b$ of the tubular section to the other margin at $3^m$ of the supplemental web. The next pick will extend from said margin at $3^m$ through the cloth of the pocket-front from the pocket-mouth to the closed bottom of the pocket. The next pick will extend from the closed bottom of the pocket through the back wall of the pocket to the edge of said wall at the mouth of the pocket. The weft or filling will connect together the two cloths $3^b$, $3^c$, at the outer margin of the supplemental web, thereby forming the closed end $3^e$ of the tubular section, so that at such end the tubular section will be woven closed. It also will join the cloth $3^b$ of the supplemental web at the other margin of the supplemental web to the pocket-front at the mouth of the pocket. In following the reverse course, the weft or filling will extend through the respective portions in an inverse order to the free edge of portion $3^c$, and so on. At the sides of a tubular section the warp-threads and weft or filling preferably will be interwoven to join the two cloths together in the portions $3^d$, $3^d$, thereby closing the tubular section at its sides. Between the places of union $3^d$, $3^d$, of successive tubular section, at places corresponding substantially with the interval between one pocket and the next, the warp-threads of the supplemental web usually will be left unwoven, by floating the same, so as to save weft or filling and time in weaving. The weaving of the main web with its pockets concurrently with that of the supplemental web will proceed according to the preferred method. The severing of the supplemental web transversely to separate the flap-sections from one another is effected by cutting across the latter web at intermediate points, for example through the unwoven floated portions of the warp-threads thereof, as will appear from the short ends upon the section 3[a] in Fig. 1. These ends are trimmed off subsequently. This places the flap-sections in condition to be introverted, which operation is then performed and followed by the other finishing operations.

The broad principles and features of the construction and method, disclosed but not broadly claimed herein, form the subject of claim in my application for U. S. Letters Patent filed September 19, 1918, Serial No. 254,741.

What is claimed as the invention is,—

1. A pocketed carrier having an introverted pocket cover-flap woven as a part of the pocket-front and comprising a plurality of thicknesses of cloth which are united marginally, with the raw marginal edges inclosed between such thicknesses.

2. A pocketed carrier having a pocket cover-flap woven as a part of the pocket-front and comprising a plurality of thicknesses of cloth which are woven together marginally, said cover-flap introverted substantially as set forth whereby the margins are faced inward.

3. A pocketed carrier provided with an introverted tubular pocket cover-flap woven as a part of the pocket-front and having its free end woven closed.

4. A pocketed carrier provided with an introverted pocket cover-flap of seamless tubular weave woven as a part of the pocket-front and having its free end woven closed.

5. A pocketed carrier having a pocket cover-flap woven as a part of the pocket-front and comprising a plurality of thicknesses of cloth which are joined together marginally by being interwoven in flat marginal flanges.

6. A pocketed carrier provided with a pocket cover-flap woven as a part of the pocket-front and comprising a plurality of thicknesses of cloth which are woven together along the side-margins of the cover-flap and also across the free end thereof.

7. A pocketed carrier provided with a pocket cover-flap of seamless tubular weave and having its free end woven closed, woven as a part of the pocket-front.

8. A carrier comprising a belt-member provided with a plurality of pockets, each having a cover-flap woven upon the pocket-front and fastening at the back of the belt-member.

9. A woven pocketed carrier comprising a belt-member provided with a plurality of pockets, each having a cover-flap attached to the pocket-front and fastening at the back of the belt-member.

10. A woven carrier having a plurality of pockets, and having cover-flaps independent of one another, and respectively woven upon the respective fronts of the individual pockets, and cover-flap fastenings which engage at the rear of the carrier.

11. The method of producing a series of flaps upon a main web which consists in conducting the weaving so as to form the main web and also form a supplemental web composed of transversely-tubular sections respectively having one cloth thereof woven to said main web, and then severing said supplemental web transversely between the tubular sections to separate the flaps from one another.

12. The method of producing a series of flaps upon a main web which consists in conducting the weaving so as to form the main web and also form a supplemental web composed of transversely-tubular sections respectively having one cloth thereof woven to said main web, then severing said supplemental web transversely between the tubular sections to separate the flaps from one another, and then introverting the flaps.

13. The method of producing a series of flaps upon a main web which consists in conducting the weaving so as to form the main web and also form a supplemental web composed of transversely-tubular sections respectively having one cloth thereof woven to said main web, and in addition weave the cloths of said sections together along the outer margin of the supplemental web, and then severing said supplemental web transversely between the tubular sections to separate the flaps from one another.

14. The method of producing a series of flaps upon a main web which consists in conducting the weaving so as to form the main web and also form a supplemental web composed of transversely-tubular sections respectively having one cloth thereof woven to said main web, and in addition weave the cloths of said sections together along the outer margin of the supplemental web, then severing said supplemental web transversely between the tubular sections to separate the flaps from one another, and then introverting the flaps.

15. The method of producing a series of pocket cover-flaps upon a pocketed carrier-web which consists in conducting the weaving so as to form a main web with pockets and also form a supplemental web composed of transversely-tubular sections at the corresponding pockets, respectively having one cloth thereof woven to said carrier-web, and then severing said supplemental web transversely between pockets to separate the flaps from one another.

16. The method of producing a series of pocket cover-flaps upon a pocketed carrier-web which consists in conducting the weaving so as to form a main web with pockets and also form a supplemental web composed of transversely-tubular sections at the corresponding pockets, respectively having one cloth thereof woven to said carrier-web, then severing said supplemental web transversely between pockets to separate the flaps from one another, and then introverting the flaps.

In testimony whereof I affix my signature in presence of two witnesses.

GEORGE W. SPALDING.

Witnesses:
VICTOR H. JENNINGS,
FLORENCE K. BERRY.